US012408730B1

(12) United States Patent
Holan et al.

(10) Patent No.: US 12,408,730 B1
(45) Date of Patent: Sep. 9, 2025

(54) PERSONALIZED SHOE INSOLES

(71) Applicant: Amazon Technologies, Inc., Seattle, WA (US)

(72) Inventors: Eric Steven Holan, Seattle, WA (US); Justin O'Neil Robinson, Lancaster, SC (US); Jennifer L. Stockman, Redmond, WA (US); Asfand Yar Khan, Redmond, WA (US); Tushar Mahale, Seattle, WA (US); Jinsup Song, Bala Cynwyd, PA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 488 days.

(21) Appl. No.: 17/951,363

(22) Filed: Sep. 23, 2022

(51) Int. Cl.
A43B 17/00 (2006.01)
A43D 1/02 (2006.01)
B29D 35/12 (2010.01)

(52) U.S. Cl.
CPC .............. A43B 17/00 (2013.01); A43D 1/02 (2013.01); B29D 35/12 (2013.01)

(58) Field of Classification Search
CPC ........... A43B 17/00; A43D 1/02; B29D 35/12
See application file for complete search history.

(56) References Cited

U.S. PATENT DOCUMENTS

| 7,552,494 | B2 * | 6/2009 | Peterson | A43D 1/02 33/3 R |
| 7,793,433 | B2 * | 9/2010 | Hakkala | A43B 7/28 36/154 |
| 7,854,071 | B2 * | 12/2010 | Goonetilleke | A61B 5/1074 33/3 R |
| 8,171,589 | B2 * | 5/2012 | Hakkala | A43D 1/025 12/146 B |
| 10,013,711 | B2 * | 7/2018 | Gooch | A43D 1/06 |
| 10,067,500 | B2 * | 9/2018 | Hargovan | A43B 17/00 |
| 10,564,628 | B2 * | 2/2020 | Hargovan | G06T 19/20 |
| 2006/0283243 | A1 * | 12/2006 | Peterson | A61B 5/1036 73/172 |
| 2007/0039205 | A1 * | 2/2007 | Erb | A43B 3/26 705/26.1 |
| 2007/0039208 | A1 * | 2/2007 | Bove | G06Q 30/06 36/31 |
| 2007/0039209 | A1 * | 2/2007 | White | G06Q 30/06 36/31 |

(Continued)

Primary Examiner — Yaritza Guadalupe-McCall
(74) Attorney, Agent, or Firm — Knobbe, Martens, Olson & Bear, LLP

(57) ABSTRACT

Disclosed are various embodiments for creating personalized insoles designed to provide physical comfort to the individual wearing shoes containing the personalized insoles. A three-dimensional (3D) foot scan is performed on the individual's feet to better understand the contours and geometry of each foot of the individual. In addition, a 3D insole scan of the current insole of the shoe is performed to determine an accurate outline of the insole as well as to identify any wear patterns and compression points within the insole. The 3D foot scan combined with the 3D insole scan is used to generate the personalized insole that is accurately sized to fit into the corresponding shoe. The personalized insole is designed to be inserted into the shoe in order to provide a supportive fit that is personalized for both the individual and shoe in order to minimize foot pain and/or discomfort for the individual.

19 Claims, 9 Drawing Sheets

(56) References Cited

U.S. PATENT DOCUMENTS

| | | | | |
|---|---|---|---|---|
| 2007/0043582 | A1* | 2/2007 | Peveto | A43B 23/027 |
| | | | | 705/26.1 |
| 2016/0125499 | A1* | 5/2016 | Gooch | A43D 1/08 |
| | | | | 705/26.7 |
| 2017/0190121 | A1* | 7/2017 | Aggarwal | A43D 1/025 |
| 2017/0255185 | A1* | 9/2017 | Hinshaw | A43D 1/025 |
| 2017/0272728 | A1* | 9/2017 | Rafii | G06Q 30/0631 |
| 2019/0175070 | A1* | 6/2019 | Decker | A61B 5/1074 |
| 2019/0209093 | A1* | 7/2019 | Watts | A61B 5/004 |
| 2020/0257266 | A1* | 8/2020 | Hargovan | G06T 19/20 |
| 2021/0042458 | A1* | 2/2021 | Dayal | G06F 30/23 |
| 2021/0315323 | A1* | 10/2021 | Hakkala | A61B 5/0064 |
| 2022/0061463 | A1* | 3/2022 | Vanderoef | B29D 35/122 |
| 2024/0138523 | A1* | 5/2024 | Wang | A43B 3/44 |
| 2024/0358120 | A1* | 10/2024 | Cataldi | A43B 17/00 |
| 2025/0064169 | A1* | 2/2025 | Vandecruys | B33Y 80/00 |

* cited by examiner

PERSONALIZED SHOE INSOLES

BACKGROUND

Foot pain or discomfort can be caused from a variety of factors, including standing on one's feet for an extended period of time. For example, associates working in an environment (e.g., fulfillment center) that causes them to be on their feet on hard surfaces (e.g., concrete) for prolonged amounts of time may experience foot pain or discomfort. Individuals can place generic inserts or insoles in their shoes that may be designed to relieve pressure or discomfort due to standing all day. However, these generic insoles may not properly fit in the individuals shoe requiring the individual to trim away portions of the insole to make the insole fit into the individual's shoe. In addition, the generic insoles may have features for relieving the pressure or discomfort that fail to align with the contours of the individual's foot and/or their overall foot geometry.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3A illustrates a top view of the scanner system and FIG. 3B illustrates a cross section of a side view of the scanner system.

FIG. 4A illustrates a top view of the scanner system and FIG. 4B illustrates a cross section of a side view of the scanner system.

FIG. 5A illustrates a back view of the foot positioned on the scanner top plate. FIG. 5B illustrates a bottom view of the foot positioned on the scanner top plate. FIG. 5C illustrates a side view of the foot positioned on the scanner top plate.

DETAILED DESCRIPTION

The present disclosure relates to manufacturing scalable and personalized insoles that are designed to provide physical comfort to the individual wearing shoes containing the personalized insoles. An insole corresponds to the part of the shoe that is located at the bottom of the inside of a shoe and engages with the sole of the foot of the individual wearing the shoe. According to various embodiments of the present disclosure, a three-dimensional (3D) foot scan is performed on the individual's feet to better understand the contours and geometry of each foot of the individual. In addition, for each shoe, a 3D insole scan of the original (or current) insole of the shoe can be performed to determine an accurate outline of the insole as well as to identify any wear patterns and compression points within the insole. According to various examples, the 3D foot scan combined with the 3D insole scan can be used to generate an insole that is accurately sized to fit into the corresponding shoe. The personalized insole is designed to replace the original insole of the shoe in order to provide a more supportive fit that is personalized for the individual and shoe in order to minimize foot pain and/or discomfort for the individual when the individual is standing for an extended period of time.

Figure 1:
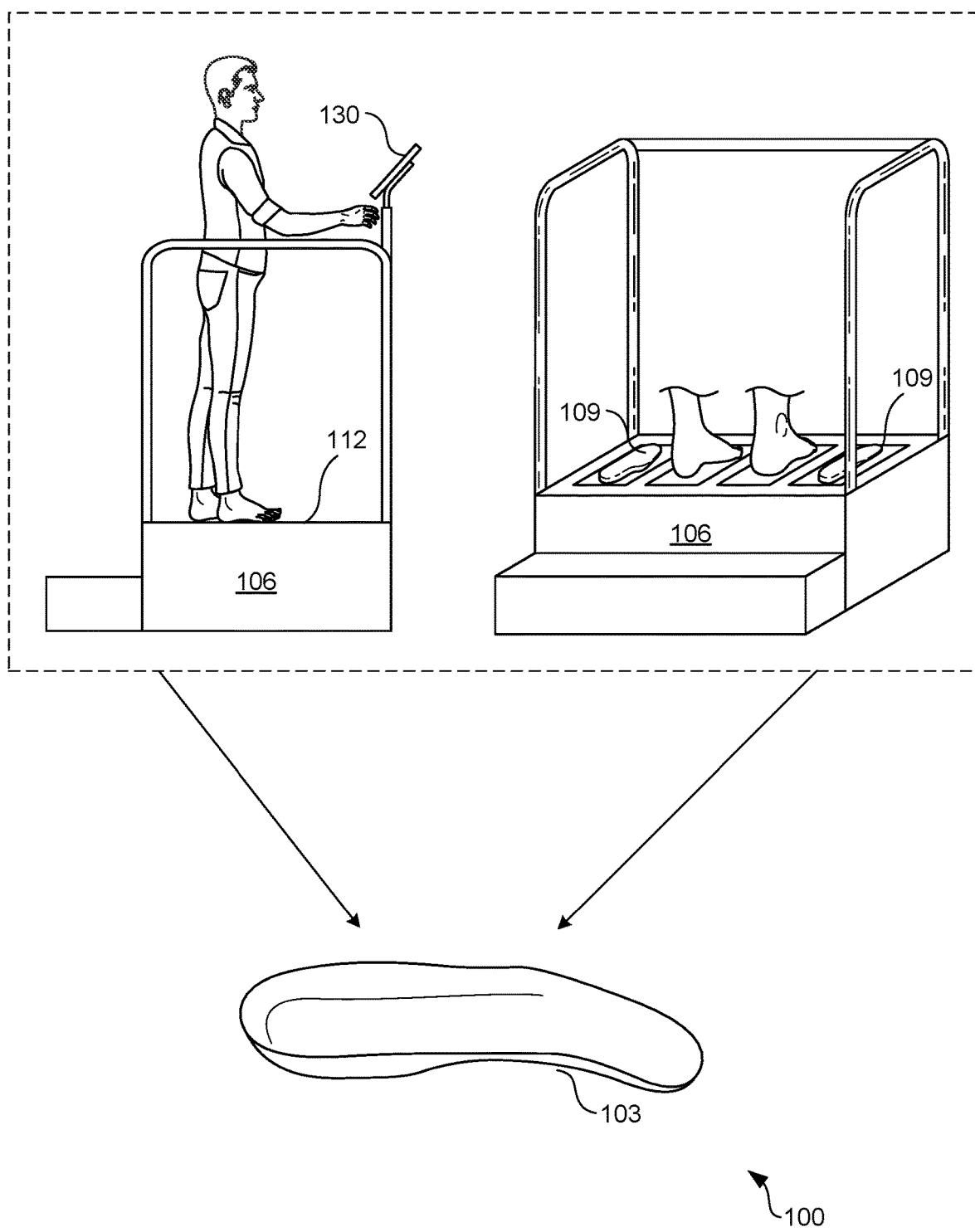
FIG. 1 is a drawing of an example scenario associated with obtaining a foot scan and an insole scan from a scanner system to generate a personalized insole according to various embodiments of the present disclosure.

Turning now to FIG. 1, shown is an example scenario 100 associated with the creation of personalized insoles 103 according to various embodiments. In particular, shown is side view and a perspective view of an example scanner system 106 that is configured to perform a foot scan of an individual's feet as well as an insole scan of one or more insoles 109 obtained from the individual's shoe(s). In various examples, an individual can position his or her feet on a scanner top plate 112 of the scanner system 106 to allow a foot scan to be performed on his or her bare feet. In various examples, the original (or current) shoe insoles 109 from an individual's shoes can be removed and placed face down on the scanner top plate 112 of the scanner system 106 to allow an insole scan to be performed on the original (or current) shoe insoles 109 of the shoe. Once the individual's feet and/or the insoles 109 are properly positioned on the scanner top plate 112 of the scanner system 106, the scanner system 106 can perform the foot scan and/or the insole scan by capturing images of the individual's feet and/or insoles 109 from various angles.

The foot image data 115 (FIG. 2) from the foot scan and the insole image data 118 (FIG. 2) from the scan can be analyzed to generate personalized insole data 121 (FIG. 2) for a personalized insole 103 that can be placed in the individual's shoe and conforms to the contours and overall foot geometry of the individual's foot. In various examples, the foot image data 115 can correspond to multiple foot scans of a foot in different positions or orientations. Various approaches for generating personalized insole data 121 based on foot scans of a foot in various positions or orientations are described in U.S. patent application Ser. No. 17/951,368, entitled "PERSONALIZED INSOLES FOR SUPPORTING A FOOT IN AN ALIGNED LOAD BEARING POSITION," filed Sep. 23, 2022, which is incorporated by reference herein in its entirety.

In various examples, the foot image data 115 can be used to generate a 3D representation of the user's foot and identify characteristics of the user's foot including, for example, a foot length, a foot width, toe sizes, metatarsal head location, arch height, arch length, and/or other features. The insole image data 118 can be used to generate a 3D representation of the shoe's insole 109. In various examples, one or more attributes can be determined from an analysis of the insole image data 118 and/or the 3D representation of the insole 109. The attributes can correspond to an insole shape, a metatarsal head location, wear patterns, walk patterns, pressure areas, and/or other data. For example, if the user has been wearing the particular shoe for a given length of time, the original insole 109 included in the shoe can include various features defining pressure areas and/or walk patterns of the individual. In addition, the insole scan may indicate a change in thickness, color, and/or texture of the insole 109 that can indicate wear patterns and pressure points associated with the individual.

In various examples, the identified attributes can be used to modify the 3D representation of the user's foot and/or the personalized insole data 121 generated based at least in part on the 3D representation of the foot. It should be noted that the original insole 109 is not limited to an insole that is original to the shoe at the time the shoe is manufactured, and can correspond to a previously made personalized insole 103 and/or other type of insole that is positioned in the shoe and can provide details about the individual's foot and size of shoe.

In various examples, the personalized insole data 121 comprises an image file format (e.g., computer-aided design (CAD) file) that can be read by a manufacturing system 124 to create a three-dimensional object that corresponds to the personalized insole 103. In other examples, the personalized insole data can be converted into an image file format that can be read by the manufacturing system 124.

It should be appreciated that the personalized insole 103 or one or more components of the personalized insole 103 can be manufactured using a manufacturing device 124 and/or process that employs one or more manufacturing techniques such as, for example, 3D printing, injection molding, casting, compression molding, and/or other techniques. In various examples, the personalized insole 103 can be manufactured as a single component. In other examples, the personalized insole 103 comprises multiple components where one or more components can be manufactured using differing manufacturing processes. In addition, in some examples, the manufacturing process is fully automated. In other examples, the manufacturing process can include one or more manual steps.

In various examples, the personalized insole 103 comprises a ¾ length insole that extends from a heel of a foot to the surface of the ball of the foot (e.g., metatarsal head). In various examples, the insole scan combined with the foot scan can be used to estimate an accurate location of the metatarsal head of the foot to help ensure that the leading edge of the ¾ length shoe insole is placed correctly against the individual's foot in order to provide comfort and minimize any foot pain or discomfort. In various examples, a foam layer 127 (FIG. 5) extending the length of the foot (e.g., heel to the end of the big toe) is placed on top of the personalized insole 103. It should be noted that the personalized insole 103 or personalized insole components are not limited to ¾ length and can be greater than or less than ¾ length. For example, the personalized insole 103 can extend the length of the individual's foot.

In various examples, the individual can perform one or more onboarding tasks via interactions with a client device 130. The onboarding tasks can be designed to instruct the individual how to stand on the scanner system 106 and how to place the original insoles 109 on the scanner system 106. For example, the original insoles 109 can be placed face down on the scanner top plate 112 to allow image sensors 133 (FIG. 2) placed about the scanner top plate 112 to obtain an accurate scan of the portion of the original insoles 109 that engage with the foot sole of the individual.

In addition, the onboarding tasks can be used to collect onboarding data corresponding to the individual and/or the shoe that the personalized insole is being created for. For example, the onboarding data can include user characteristics 136 (FIG. 2) and/or shoe properties 139 (FIG. 2) corresponding to the individual and/or the shoe that the personalized insole is being created for. The user characteristics 136 can include, for example, a user name, a user height, a user weight, a user foot size, a user foot length, a user foot width, a role of the user in an organization, an estimated amount of time the user is on his or her feet during a given day, one or more individual defined conditions of the foot (e.g., foot pain, plantar fasciitis, Morton's toe heel pain, neuroma, high arches, etc.), and/or other data. The shoe properties 139 can include a shoe type, a shoe brand, a shoe size, an estimated wear time of the shoe by the individual prior to scanning the original insole 109, and/or other information. In various examples, the onboarding data can be used by the scanner system 106 to obtain an accurate foot scan and/or insole scan.

According to various examples, the scanner system 106 is designed to capture an optical scan of a foot from multiple angles using an array of image sensors 133 (FIG. 2) that are positioned about the scanner top plate 112. In contrast to traditional pressure scanning techniques, the optical scanning methods of the present disclosure are able to accurately obtain contour and foot geometry data. For example, in optical scanning, the arch of a foot is not in contact with the scanner top plate 112 and it is a specific height from the surface of the scanner top plate 112. While this specific height can be captured in the optical scan, it cannot be accurately obtained via a pressure scan. In addition, the use of an array of image sensors 133 instead of a traditional single traversing scanner provides a scalable scanning solution that limits the overall scanning time of the foot and/or insoles, thereby reducing the amount of time it takes to create and generate the personalized insoles 103 for the user. In the following discussion, a general description of the system and its components is provided, followed by a discussion of the operation of the same.

Figure 2:
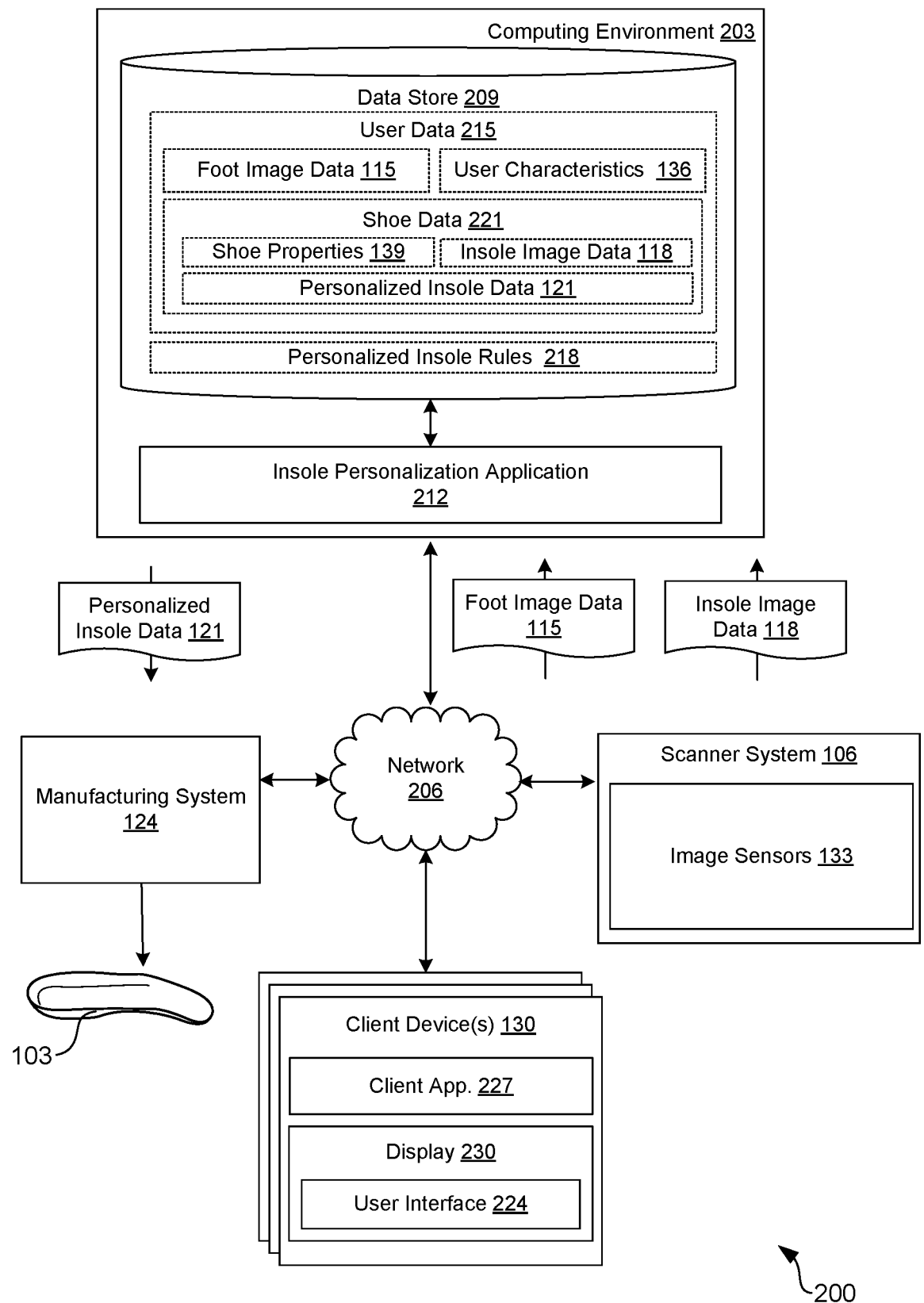
FIG. 2 is a schematic block diagram of a networked environment according to various embodiments of the present disclosure.

With reference to FIG. 2, shown is a networked environment 200 according to various embodiments. The networked environment 200 includes a computing environment 203, a client device 130, a scanner system 106, and a manufacturing system 124, which are in data communication with each other via a network 206. The network 206 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 209 that is accessible to the computing environment 203. The data store 209 may be representative of a plurality of data stores 209 as can be appreciated. The data stored in the data store 209, for example, is associated with the operation of the various applications and/or functional entities described below.

The components executed on the computing environment 203, for example, include an insole personalization application 212, and other applications, services, processes, systems, engines, or functionality not discussed in detail herein. The insole personalization application 212 is executed to generate personalized insole data 121 based at least in part on an analysis of foot image data 115 and/or insole image data 118 obtained from a scanner system 106. In various examples, the foot image data 115 corresponds to various images of an individual's foot that are captured via an array of optical image sensors 133 placed about a scanner top plate 112 on which the individual has positioned his or her feet during the foot scan. The insole personalization application 212 can combine the captured images included in the foot image data 115 to generate a 3D representation of the individual's foot. In various examples, the 3D representation comprises point cloud data associated with the image data captured from the array of optical image sensors 133. In various examples, the insole personalization application 212 can analyze the foot image data 115 and/or the 3D representation to identify contours of the foot and the overall foot geometry. For example, the insole personalization application 212 can analyze the foot image data 115 to identify characteristics of the user's foot including, for example, a foot length, a foot width, toe sizes, metatarsal head location, arch height, arch length, and/or other features.

In various examples, the insole image data 118 corresponds to images of a top portion of an original insole 109 that is positioned face down on a scanner top plate. The images are captured via one or more optical image sensors 133 placed about a scanner top plate 112. The insole personalization application 212 can combine the captured images included in the insole image data 118 to generate a 3D representation of the original insole 109. In various examples, the 3D representation comprises point cloud data associated with the insole image data 118 captured from the one or more optical image sensors 133.

In various examples, the insole personalization application 212 analyzes the insole image data 118 and/or the 3D representation generated from the insole image data 118 to identify one or more attributes associated with the original insole 109. The one or more attributes can correspond to an insole shape, a metatarsal head location, one or more wear patterns, one or more walk patterns, one or more pressure areas, and/or other data. For example, if the user has been wearing the particular shoe for a given length of time, the original insole 109 included in the shoe can include various features indicating pressure areas, wear patterns, and/or walk patterns (e.g., toe walker, etc.) of the individual. In addition, the insole image data 118 may indicate a change in thickness, color, and/or texture of the original insole 109 that can indicate wear patterns and pressure points associated with the individual. In various examples, the attributes can be used to modify the 3D representation of the user's foot and/or the personalized insole data 121 generated based at least in part on the 3D representation of the insole.

In various examples, the insole personalization application 212 can generate personalized insole data 121 corresponding to a 3D representation of a personalized insole 103 based at least in part on the 3D foot representation, the 3D insole representation, the identified attributes, the user characteristics 136, the shoe properties 139, and/or other data. In various examples, the personalized insole data 121 defines the shape, size, and contours the personalized insole 103 that is determined according to the 3D foot representation and identified insole attributes. In some examples, the personalized insole data 121 represents a negative of the bottom of the 3D foot representation that is modified according to the identified attributes from the 3D insole representation, the user characteristics 136, the shoe properties 139 and/or other data. For example, an analysis of the 3D foot representation and the 3D insole representation can be used to estimate a location of the metatarsal head of the foot. This estimated location can be used to define the size of a ¾ length insole that extends from the heel of the foot to the start of the metatarsal head of the foot to help ensure that the leading edge of the ¾ length personalized insole 103 is placed correctly against the individual's foot in order to provide comfort and minimize any foot pain or discomfort.

In various examples, the insole personalization application 212 can input features associated with the 3D foot representation, the 3D insole representation, the identified attributes, the user characteristics 136, the shoe properties 139, and/or other data into a machine learning model that is trained to output the personalized insole data 121 based at least in in part on the various inputs. In various examples, the model can be trained to identify various attributes associated with the foot and modify the 3D foot representation to account for the various attributes such that personalized insole 103 generated using the personalized insole data 121 can be inserted into the individual's shoe in order to minimize foot pain or discomfort while the individual is wearing the shoe.

In various examples, the personalized insole data 121 comprises an image file format (e.g., computer-aided design (CAD) file) that can be read by a manufacturing system 124 to create a three-dimensional object that corresponds to the personalized insole 103. In other examples, the personalized insole data 121 can be converted into an image file format that is readable by the manufacturing system 124. In some examples, the insole personalization application 212 can transmit the personalized insole data 121 to a manufacturing system 124 configured to create or otherwise print a 3D object corresponding to the personalized insole 103 based at least in part on the features of the personalized insole data 121.

The data stored in the data store 209 includes, for example, user data 215, personalized insole rules 218, and potentially other data. The user data 215 includes data associated with the individual who is receiving the personalized insoles 103. For example, the user data 215 can include the foot image data 115, user characteristics 136, shoe data 221, and/or other data associated with one or more foot scans of the individuals. The foot image data 115 includes data corresponding to various images of the bottom of an individual's foot and/or the individual's hindfoot that are captured via the optical image sensors 133 placed about a scanner top plate 112 on which the individual has positioned his or her feet during the foot scan. In various examples, the foot image data 115 can be segmented into data for the left foot and/or the right foot of the individual. The user data 215 can further include user characteristics 136 including, for example, a user name, a user height, a user weight, a user foot size, a user foot length, a user foot width, a role of the user in an organization, an estimated amount of time the user is on his or her feet during a given day, one or more individual defined conditions of the foot (e.g., foot pain, plantar fasciitis, Morton's toe, heel pain, neuroma, high arches, etc.), and/or other data. In various examples, the user characteristics 136 can be obtained via an onboarding process where the individual or other associate interacts with a client device 130 to define the user characteristics 136 associated with the individual.

The shoe data 221 corresponds to data for a given shoe and/or pair of shoes. In various example, an individual may have multiples shoes and want personalized insoles 103 for each pair of shoes. However, in accordance with various embodiments of the present disclosure, a personalized insole 103 is personalized for the individual and a specific shoe as each shoe may vary in dimensions and size thereby causing differences in sizes and shapes of a personalized insole 103. In various examples, the shoe data 221 comprises shoe properties 139, insole image data 118, personalized insole data 121, and/or other data. The shoe properties 139 can comprise a shoe type, a shoe brand, a shoe size, an estimated wear time of the shoe by the individual prior to scanning the original insole 109, and/or other information. In various examples, the shoe properties 139 can be obtained via an onboarding process where the individual or other associate interacts with a client device 130 to define the shoe properties 139 associated with the shoe. In some examples, one or more of the shoe properties 139 can be obtained via a request to the shoe manufacturer and/or other third-party trusted entity.

The insole image data 118 corresponds to images of a top portion of an original insole 109 that is positioned face down on a scanner top plate 112. The images are captured via one or more optical image sensors 133 placed about a scanner top plate 112 and can be used to generate a 3D representation of an insole 109 and/or identify attributes associated with the insole 109 and the individual wearing the shoe containing the insole 109. In various examples, the insole image data 118 can be segmented into data for the left insole and/or the right insole of the individual's shoe.

In various examples, the personalized insole data 121 corresponds to a 3D representation of a personalized insole 103 based at least in part on the 3D foot representation, the 3D insole representation, the identified attributes, the user characteristics 136, the shoe properties 139, and/or other data. The personalized insole data 121 defines the shape, size, and contours the personalized insole 103 that is determined according to the 3D foot representation and identified insole attributes. In various examples, the personalized insole data 121 represents a negative of the bottom of the 3D foot representation that is modified according to the identified attributes from the 3D insole representation, the user characteristics 136, the shoe properties 139 and/or other data.

In some examples, the personalized insole data 121 comprises an image file format (e.g., computer-aided design (CAD) file) that can be read by a manufacturing system 124 to create a three-dimensional object that corresponds to the personalized insole 103. In other examples, the personalized insole data 121 can be converted into the image file format that is readable by a manufacturing system 124. The personalized insole data 121 can be transmitted to the manufacturing system 124 which in turn prints a 3D object corresponding to the personalized insole 103 based at least in part on the features of the personalized insole data 121.

The personalized insole rules 218 include rules, models, and/or configuration data for the various algorithms or approaches employed by the insole personalization application 212. For example, the personalized insole rules 218 can include the various models and/or algorithms for generating 3D representations of the foot image data 115 and/or the insole image data 118. In addition, the personalized insole rules 218 can include the various models and/or algorithms for identifying attributes from the insole image data 118 and modifying the 3D representation of the foot image data 115 and/or the personalized insole data 121 based at least in part on the identified attributes. In various examples, the personalized insole rules 218 can include one or more trained models that can output the personalized insole data 121 for generating a personalized insole 103 by applying inputs and/or factors associated with the 3D representations of the foot and/or insoles 109, the user characteristics 136, the shoe prosperities 139, and/or other data.

The scanner system 106 comprises a scanner comprising a plurality of image sensors 133 disposed about a scanner top plate 112 and configured to obtain images of an individual's feet, individual's hindfoot for each foot, and/or original insoles 109 that are positioned on top of the scanner top plate 112. In various examples, the scanner system 106 comprises an optical scanner that uses optical image sensors 133 to scan perform the foot scan and/or the insole scan and obtain the corresponding foot image data 115 and/or insole image data 118. FIGS. 3A-4B illustrate examples of different embodiments of a scanner system 106 that can be used to obtain the foot image data 115 and/or the insole image data 188. According to various embodiments, the scanner system 106 comprises control circuitry for controlling and interfacing with the image sensors 133 as well as for interfacing with the insole personalization application 212 of the computing environment 203 and the client application 227 of the client device 130.

The manufacturing system 124 is a system configured to manufacture a 3D object from a digital file. In various examples, the manufacturing system 124 is configured to apply one or more manufacturing techniques such as, for example, 3D printing, injection molding, casting, compression molding, and/or other techniques to manufacture a 3D object based at least in part on the personalized insole data 121. For example, in some embodiments, the manufacturing system 124 comprises a 3D printer configured to print a 3D version of the personalized insole 103 or one or more components of the personalized insole 103 in accordance to the personalized insole data 121.

In various examples, the personalized insole 103 can be manufactured by the manufacturing system 124 as a single component. In other examples, the personalized insole 103 comprises multiple components where one or more components can be manufactured by the manufacturing system 124 using one or more different manufacturing processes. In addition, in some examples, the manufacturing process is fully automated. In other examples, the manufacturing process can include one or more manual steps.

The client device 130 is representative of a plurality of client devices that may be coupled to the network 206. The client device 130 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 130 may include a display 230. The display 230 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 130 may be configured to execute various applications such as a client application 227 and/or other applications. The client application 227 may be executed in a client device 130 for example, to access network content served up by the computing environment 203, scanner system 106, manufacturing system 124, and/or other servers or components, thereby rendering a user interface 224 on the display 230. To this end, the client application 227 may comprise, for example, a browser, a dedicated application, etc., and the user interface 224 may comprise a network page, an application screen, etc. The client device 130 may be configured to execute applications beyond the client application 227 such as, for example, email applications, social networking applications, word processors, spreadsheets, and/or other applications.

Although the computing environment 203, the manufacturing system 124, the scanner system 106, and the client device 130 are illustrated as being separate from one another in the networked environment, it should be noted that one or more of these components can be integrated within one another. For example, the computing environment 203 can comprise the manufacturing system 124 and/or the scanner system 106. Likewise, the client device 130 can include and execute the insole personalization application 212 and receive the foot image data, insole image data 118, onboarding data, and/or other data via communications with the scanner system 106 and/or other components, as can be appreciated.

Figure 3A:
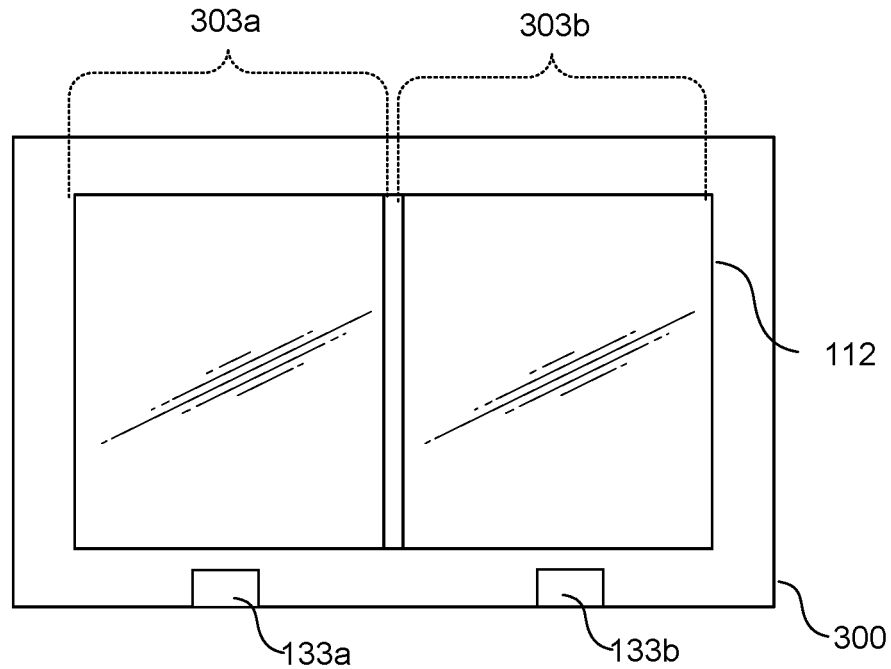
FIGS. 3A-3B illustrate drawings of an example scanner system of FIG. 2 according to various embodiments of the present disclosure.

Next, a general description of the operation of the various components of the networked environment 200 is provided with respect to FIGS. 3A-8. To begin, FIGS. 3A-3B illustrate an example of a scanner system 106a according to various embodiments of the present disclosure. FIG. 3A illustrates a top view of a scanner system 106a and FIG. 3B illustrates a side cross section view of the scanner system 106a. According to various embodiments, the scanner system 106a comprises a scanner top plate 112 secured in a scanner frame 300.

In various examples, the scanner top plate 112 comprises a transparent material (e.g., glass) that can support the weight of the individual associated with the foot scan and permits the image sensors 133 (e.g., 133a, 133b, 133c, 133d, 133e, 133f, 133g, 133h) to capture the contours and foot geometry of the foot positioned on the scanner top plate 112. In the example scanner system 106a of FIGS. 3A and 3B, the scanner top plate 112 comprises two scanning sections 303 (e.g., 303a, 303b). According to various examples, each scanning section 303 can be used for the placement of an individual's respective foot. For example, a user can be instructed to step on the scanner system 106a such that a first foot is positioned on the first scanning section 303a and a second foot is positioned on the second scanning section 303b. In various examples, each scanning section 303 can further be used for the placement of original insoles 109 corresponding to each foot for an insole scan that is conducted separately from the foot scan.

Figure 3B:
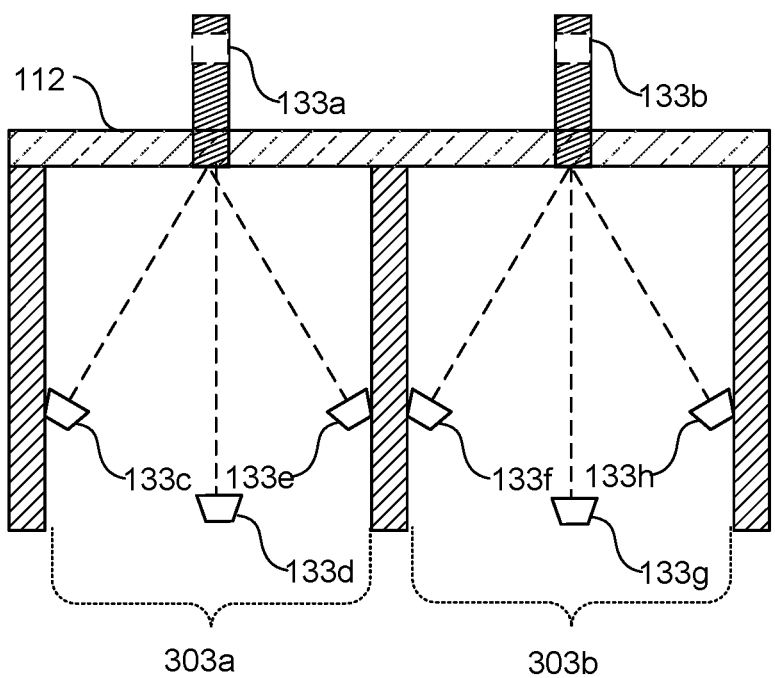

As illustrated in FIG. 3B, each scanning section 303 can comprise a respective set or array of image sensors 133 that are positioned about the scanner top plate 112. In particular, image sensors 133c-h are arranged below the scanner top plate 112. However, image sensors 133a and 133b are positioned above the scanner top plate 112 and are positioned about the scanner top plate 112 to obtain one or more images of the back of the individual's hindfoot during a foot scan. However, it should be noted that the arrangement of the images sensors 133 is not limited to the arrangements shown in FIGS. 3A, 3B, 4A, 4B, and 5A-5C and can be arranged in any desired arrangement below and/or above the scanner top plate 112 as desired to obtain the foot image data 115 needed to generate the personalized insole data 121 in accordance to various embodiments for the present disclosure.

In various examples, each scanning section 303 can comprise one or more image sensors 133 that are positioned about (e.g., below, to the side, above, etc.) the scanner top plate 112 and attached to various portions of the scanner frame 300 at varying angles such that each image sensor 133 captures an image of the scanning object (e.g., foot, insole 109) at various positions and angles. Accordingly, an optical scan of the scanning object can be based at least in part on the image data captured from the image sensors 133 for a corresponding scanning section 303.

Figure 4A:
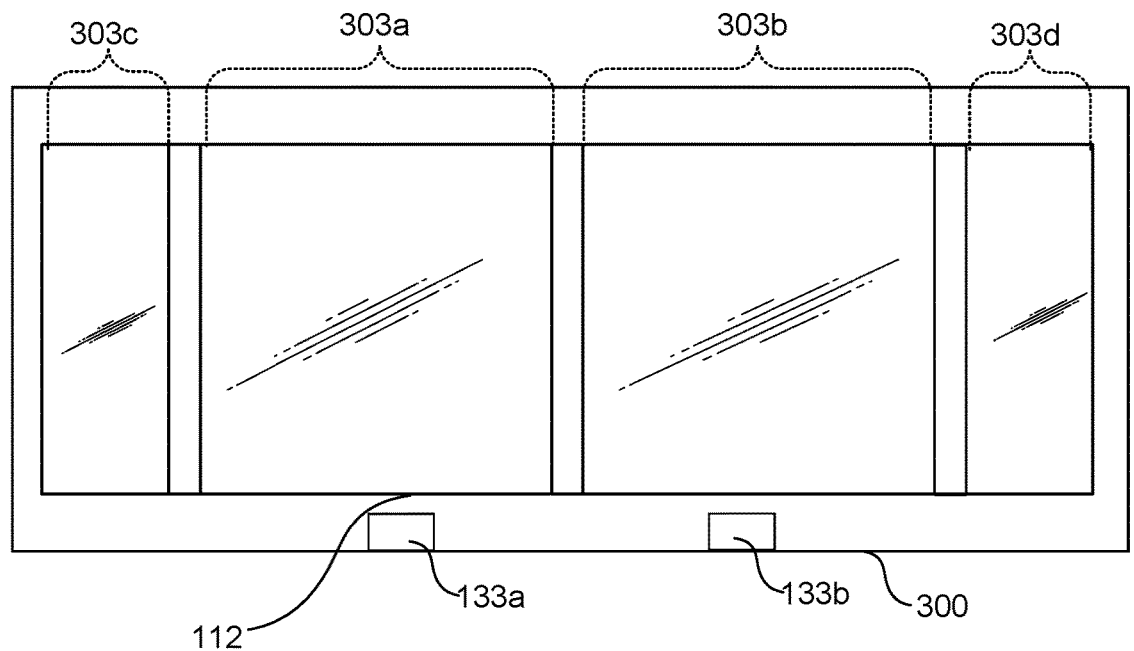
FIGS. 4A-4B illustrate drawings of another example of the scanner system of FIG. 2 according to various embodiments of the present disclosure.
Figure 4B:
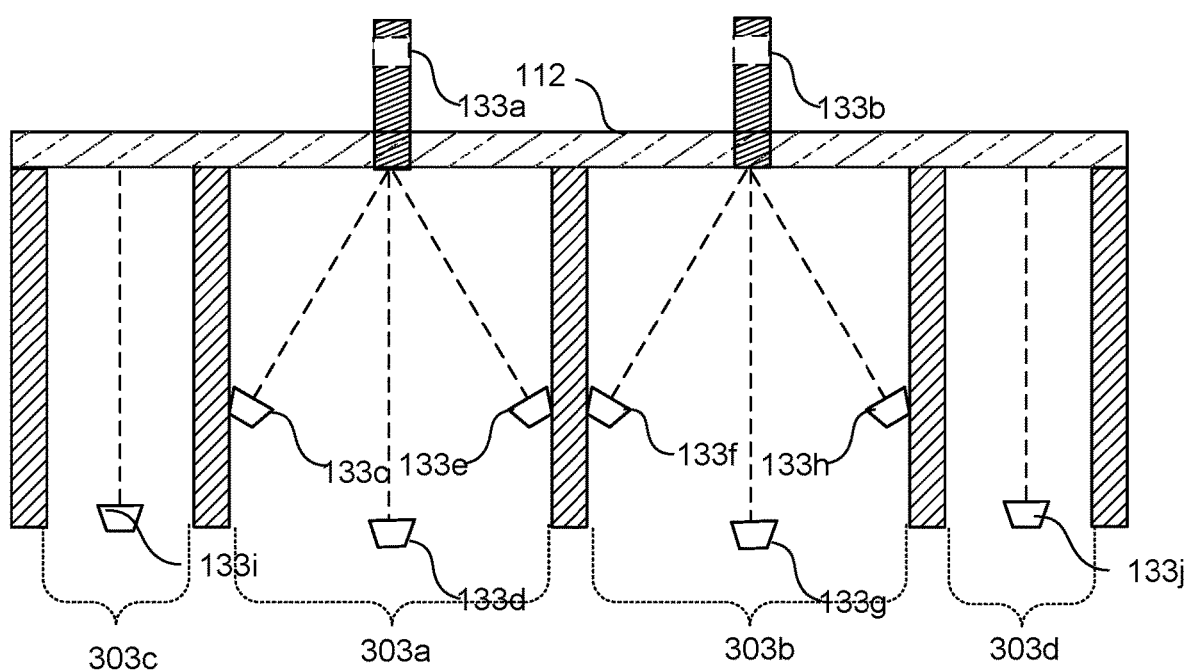

FIGS. 4A-4B illustrate another example of a scanner system 106b according to various embodiments of the present disclosure. FIG. 4A illustrates a top view of a scanner system 106b, and FIG. 4B illustrates a side cross section view of the scanner system 106b. The scanner system 106b differs from the scanner system 106a of FIGS. 3A-3B in that the scanner system 106b is configured to perform the foot scan and the insole scan simultaneously.

According to various examples, the scanner top plate 112 of the scanner system 106b includes four scanning sections 303 (e.g., 303a, 303b, 303c, 303d). Each scanning section 303 can be used for the placement of an individual's respective foot as well as the corresponding shoe insoles 109 of the shoes worn by the individual. For example, a user can be instructed to step on the scanner system 106b such that a first foot is positioned on the first scanning section 303a and a second foot is positioned on the second scanning section 303b. In addition, the user can be instructed to place a first insole 109 face down on a third scanning section 303c and a second shoe insole 109 face down on a fourth scanning section 303d.

As illustrated in FIG. 4B, scanning sections 303a and 303b can comprise a respective set or array of image sensors 133 (e.g., 133c, 133d, 133e, 133f, 133g, 133h) that are positioned below the scanner top plate 112. For example, each scanning section 303 can comprise a plurality of image sensors 133 that are positioned below the scanner top plate 112 and attached to various portions of the scanner frame 300 at varying angles such that each image sensor 133 captures an image of the scanning object (e.g., foot, insole 109) at various positions and angles. In addition, scanning sections 303a and 303b can comprises image sensors 133 (e.g., 133a, 133b) that are positioned above the scanner top plate 112 and are positioned about the scanner top plate 112 to obtain one or more images of the back of the individual's hindfoot during a foot scan.

Similarly, one or more image sensors 133 (e.g., 133i, 133j) can be placed below or around the scanning sections 303c and 303d corresponding to the insole scan. In some examples, the image sensors 133 corresponding to the insole scan can be arranged in an array of sensor at varying angles similar to the arrangement of the image sensors 133 associated with the foot scan. In other examples, as shown in FIG. 4B, the image sensors 133 corresponding to the insole scan can be placed directly below the scanner top plate 112. Accordingly, an optical scan of the scanning object (e.g., foot, insoles) can be based at least in part on the image data captured from the plurality of image sensors 133 for a corresponding scanning section 303.

Figure 5A:
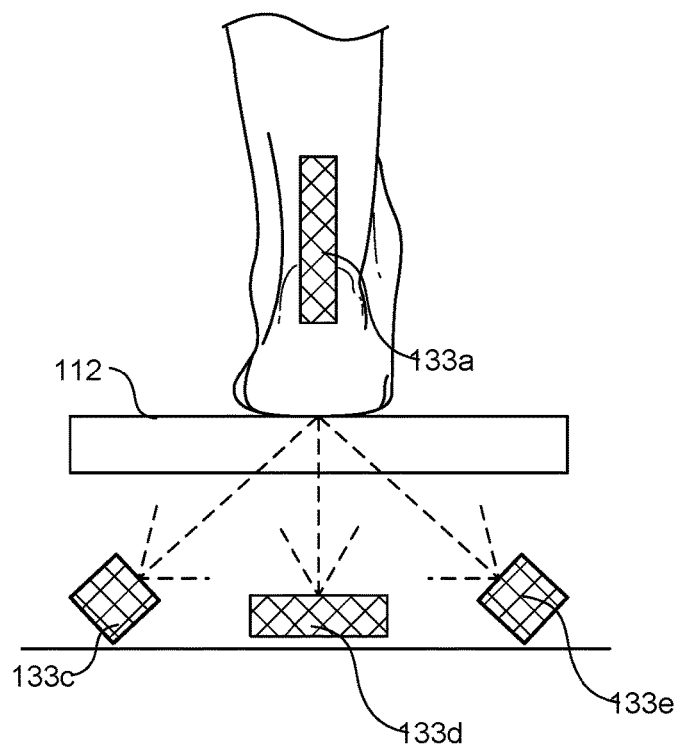
FIGS. 5A-5C illustrate drawings of example views of a foot positioned on a scanner top plate of the scanner system of FIG. 2 relative to an example arrangement of sensors of the scanner system of FIG. 2 according to various embodiments of the present disclosure.
Figure 5B:
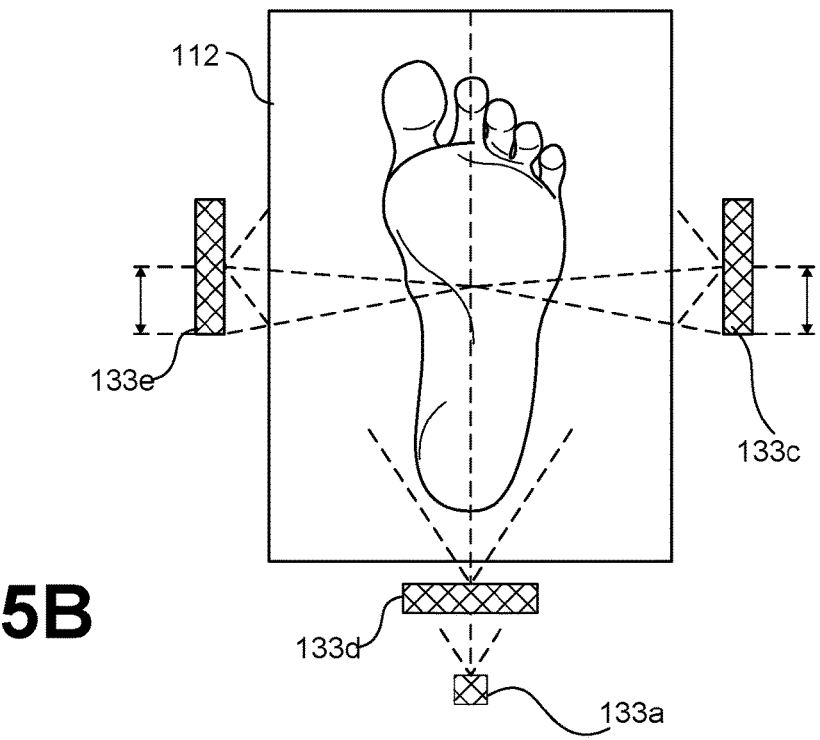
Figure 5C:
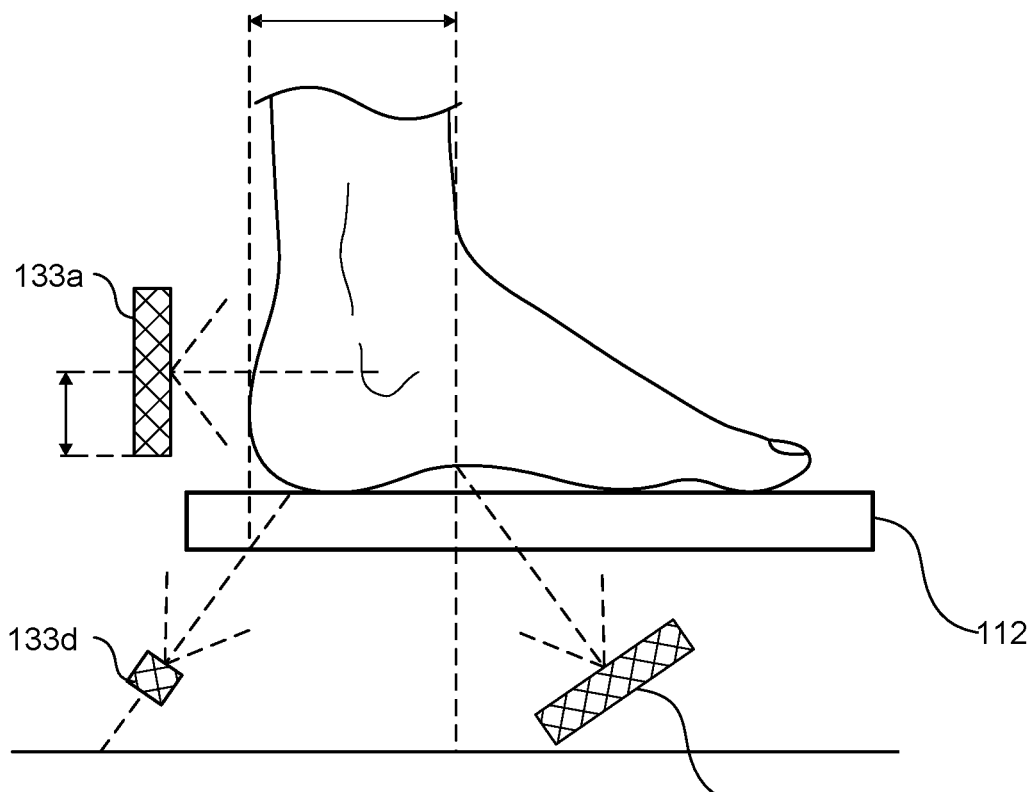

Turning now to FIGS. 5A-5C, shown are drawings of example views of a foot positioned on a scanner top plate 112 of the scanner system 106 relative to an example arrangement of sensors 133 of the scanner system 106 according to various embodiments of the present disclosure. For discussion purposes, assume that the portion of the scanner top plate 112 and corresponding sensors 133 (e.g., 133a and 133c-133e) correspond to the first scanning section 303a of the scanner system 106a of FIGS. 3A and 3B.

In particular, FIG. 5A illustrates a back view of a foot positioned on the scanner top plate 112. FIG. 5B illustrates a bottom view of the foot positioned on the scanner top plate 112. FIG. 5C illustrates a side view of the foot positioned on the scanner top plate 112. In FIGS. 5A-5C, the sensor 133a is positioned above the scanner top plate 112 such that the sensor 133a can obtain images corresponding to the back of the lower leg that illustrate hindfoot alignment. In some examples, the sensor 133a is mechanically coupled to the scanner system frame 400. In other examples, the sensor 133a is mechanically detached from the scanner system frame 400. In addition, the scanner system 106 can comprise sensors 133 (e.g., 133c-e) positioned below the scanner top plate 112 at varying angles to capture images of the bottom of the foot as positioned on the scanner top plate 112. In particular, image sensors 133c and 133e are positioned along the sides while image sensor 133d is positioned directly below the scanner top plate 112.

Figure 6:
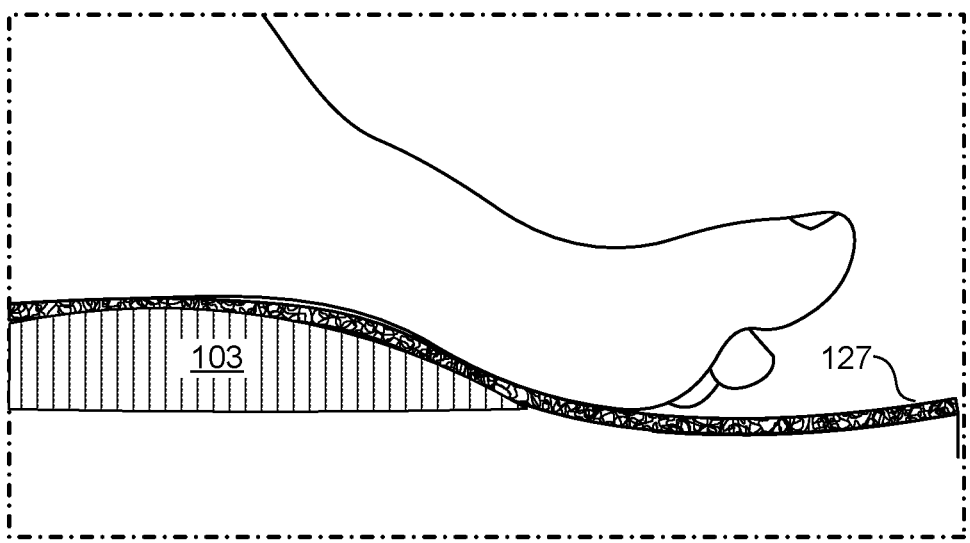
FIG. 6 illustrates a perspective drawing of an example personalized insole with an added foam layer positioned against the sole of an individual's foot, in accordance with various embodiments of the present disclosure.

Referring next to FIG. 6, shown is a perspective view of an example personalized insole 103 that is a ¾ length insole and comprises a foam layer 127 attached to a top portion of the personalized insole 103. As illustrated in FIG. 6, the personalized insole 103 and corresponding foam layer 127 engage with the sole of the individual's foot. The personalized insole 103 and corresponding foam layer 127 are sized and shape to accurately fit within a specific shoe of the individual and are personalized for the individual to provide comfort and support in accordance with the contours and foot geometry of the individual's foot.

Figure 7:
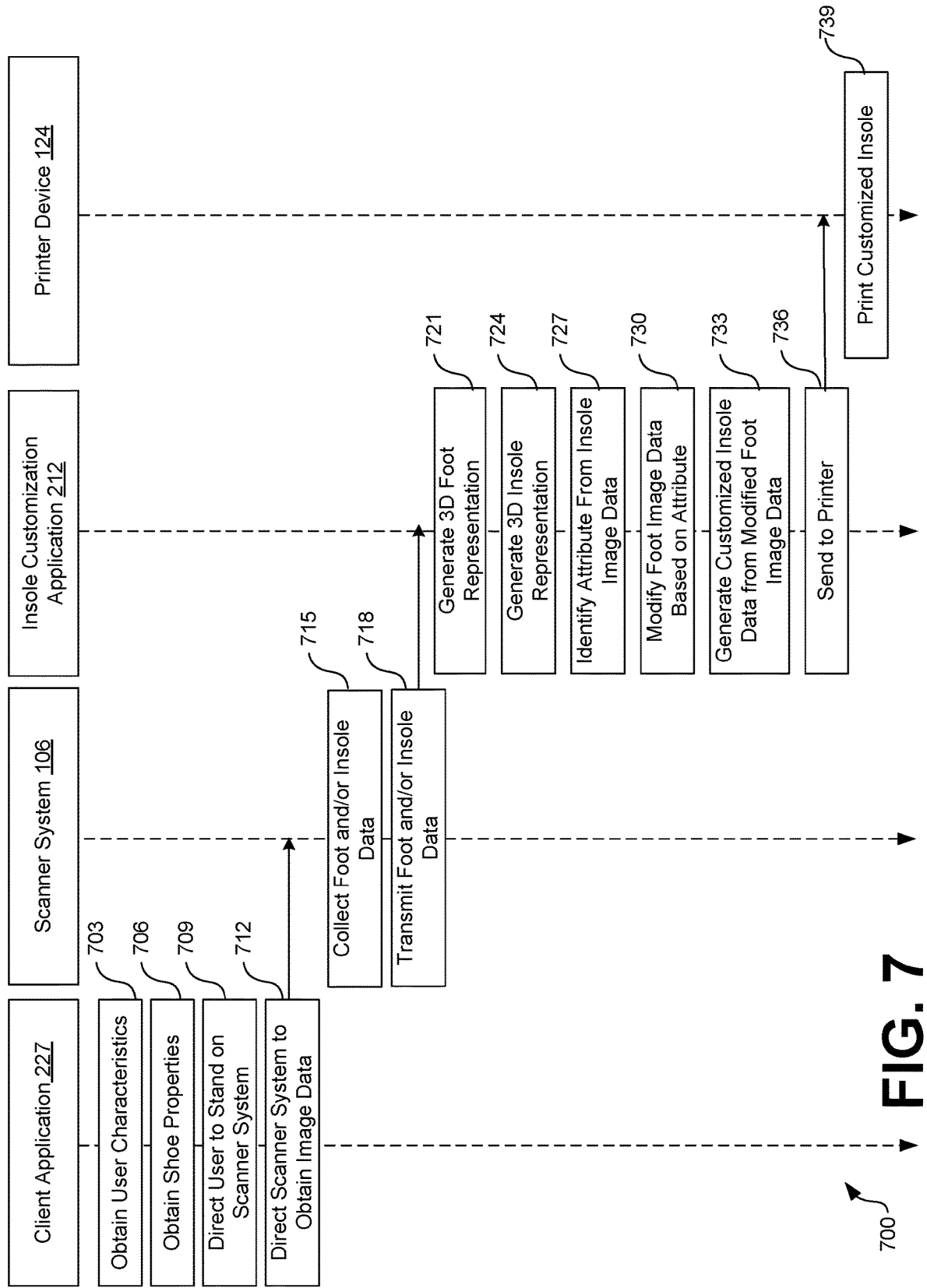
FIG. 7 is a sequence diagram illustrated one example of functionality of the various components of in the networked environment of FIG. 2 according to various embodiments of the present disclosure.

Moving on to FIG. 7 shown is a sequence diagram 700 illustrating functionality implemented by components of the networked environment 200. It is understood that the sequence diagram of FIG. 7 provides merely an example of the many different types of functional arrangements that can be employed to implement the portions of the networked environment 200 as described herein. As an alternative, the sequence diagram of FIG. 7 can be viewed as depicting an example of elements of a method implemented within the networked environment 200 in some implementations. According to various examples, FIG. 7 relates to the functionality implemented by components of the networked environment 200 in generating personalized insoles 103 based at least in part on foot image data 115 and insole image data 118 obtained from foot and insoles scans performed by the scanner system 106.

To begin, at box 703, the client application 227 obtains user characteristics 136 associated with the individual getting personalized insoles 103. For example, the user characteristics 136 can be obtained via an onboarding process where the individual or other associate interacts with the client application 227 of the client device 130 to define the user characteristics 136 associated with the individual. The user characteristics 136 can include, for example, a user name, a user height, a user weight, a user foot size, a user foot length, a user foot width, a role of the user in an organization, an estimated amount of time the user is on his or her feet during a given day, one or more individual defined conditions of the foot (e.g., foot pain, plantar fasciitis, Morton's toe, heel pain, neuroma, high arches, etc.), and/or other data. In various examples, the client application 227 can transmit the obtained user characteristics 136 to the insole personalization application 212 or to the computing environment 203 for storage in the data store 209.

At box 706, the client application 227 obtains shoe properties 139 associated with the shoe associated with the personalized insole 103. In various examples, the shoe properties 139 comprise a shoe type, a shoe brand, a shoe size, an estimated wear time of the shoe by the individual prior to scanning the original insole 109, and/or other information. In various examples, the shoe properties 139 can be obtained via an onboarding process where the individual or other associate interacts with the client application 227 of the client device 130 to define the shoe properties 139 associated with the shoe. In some examples, one or more of the shoe properties 139 can be obtained via a request to the shoe manufacturer and/or other third-party trusted entity. In various examples, the client application 227 can transmit the obtained shoe properties 139 to the insole personalization application 212 or to the computing environment 203 for storage in the data store 209.

At box 709, the client application 227 directs the individual to stand on the scanner system 106. For example, a user interface 224 can be generated and rendered on the display 230 of the client device 130. In various examples, the user interface 224 can visually or verbally indicate how the individual is to stand on the scanner system 106. For example, a user can be instructed to step on the scanner system 106 with bare feet such that a first foot is positioned on the first scanning section 303 of the scanner top plate 112 and a second foot is positioned on the second scanning section 303 of the scanning top plate. In some examples, the individual can be instructed, via the user interface 224 associated with the client application, to place a first shoe insole 109 face down on a scanning section 303 and a second shoe insole 109 face down on another scanning section.

At box 712, the client application 227 directs the scanner system 106 to obtain the foot image data 115 and/or the insole image data 118 associated with the objects positioned on the scanner top plate 112. For example, the client application 227 can be in data communication with the scanner system 106 over the network 206 and can send an instruction over the network 206 to the scanner system 106 instructing the scanner system 106 to conduct the optical scan. In some examples, a user interface 224 rendered on the display 230 of the client device 130 may include a selectable component that when selected generates and transmits an instruction to the scanner system 106 instructing the scanner system 106 to conduct the optical scan of the objects (e.g., feet, insoles 109).

At box 715, the scanner system 106 collects the foot image data 115 and/or the insole image data 118 associated with the objects positioned on the scanner top plate 112. In particular, the scanner system 106 can perform the foot scan and/or the insole scan by capturing images of the individual's feet and/or insoles 109 via the image sensors 133 that are positioned at various angles about the scanner top plate 112 of the scanner system 106.

At box 718, the scanner system 106 transmits the foot image data 115 and/or the insole image data 118 to the insole personalization application 212. In particular, as the scanner system 106 conducts the foot scan and/or insole scan and obtains the collected data from the corresponding image sensors 133, the scanner system 106 can transmit the collected data to the insole personalization application 212 over the network 206. Although FIG. 7 discusses the scanner system 106 transmitting the foot image data 115 and/or the insole image data 118 to the insole personalization application 212, in some examples, the scanner system 106 can transmit the foot image data 115 and/or the insole image data 118 to the client application 227 and/or other application which can then transmit the data to the insole personalization application 212.

At box 721, the insole personalization application 212 generates a 3D representation of the individual's foot based at least in part on the foot image data 115 obtained from the scanner system 106. In particular, the insole personalization application 212 generates point cloud data corresponding to the 3D representation of the foot based at least in part on the data included in the images obtained from the image sensors positioned at varying angles underneath the scanner top plate 112. In various examples, the insole personalization application 212 can stich or otherwise combine the various data points included in the foot image data 115 for the corresponding foot to form the 3D representation of the foot including the contours and foot geometry specific to the user's foot.

At box 724, the insole personalization application 212 generates a 3D representation of an original insole 109 based at least in part on the insole image data 118 obtained from the scanner system 106. In particular, the insole personalization application 212 generates point cloud data corresponding to the 3D representation of the insole 109 based at least in part on the data included in the images obtained from the image sensors positioned at varying angles underneath the scanner top plate 112. In various examples, the insole personalization application 212 can stich or otherwise combine the various data points included in the insole image data 118 for the corresponding shoe insole 109 to form the 3D representation of the insole including the insole shape and indications of pressure points or other features identified in the scanned shoe insole 109.

At box 727, the insole personalization application 212 analyzes the insole image data 118 and/or the 3D representation of the original insole 109 to identify attributes associated with the original insole 109. The attributes can correspond to an insole shape, a metatarsal head location, one or more wear patterns, one or more walk patterns, one or more pressure areas, and/or other data. For example, if the user has been wearing the particular shoe for a given length of time, the original insole 109 included in the shoe can include various features indicating pressure areas, wear patterns, and/or walk patterns (e.g., toe walker, etc.) of the individual. In addition, the insole image data 118 may indicate a change in thickness, color, and/or texture of the original insole 109 that can indicate wear patterns and pressure points associated with the individual.

At box 730, the insole personalization application 212 modifies the 3D representation of the user's foot based at least in part on the 3D representation of the foot. For example, an attribute may indicate a particular pressure point that is identified from the insole scan but is not necessarily apparent from 3D representation of the user's foot. Accordingly, the data points associated with the 3D representation of the user's foot can be modified to reflect an area of extra pressure when standing.

In other examples, the insole personalization application 212 can compare the 3D representation of the foot with the 3D representation of the insole and the identified attributes to estimate the location of the metatarsal head of the individual's foot. Upon estimating the location of the metatarsal head of the individual foot, the insole personalization application 212 can modify the 3D foot representation to indicate the estimated location of the metatarsal head. In examples where the personalized insole 103 is a ¾ length insole, the estimated location of the metatarsal head is useful since the personalized insole 103 of ¾ length typically extends from the heel to the location of the metatarsal head.

In some examples, the insole personalization application 212 modifies the 3D representation of the user's foot using a machine learning model trained to modify the 3D representation of the foot based at least in part on the identified attributes such that the personalized insole 103 constructed from the 3D representation of the foot is personalized to not only align with the contours and foot geometry of the individual's foot but to also compensate for areas of pressure and/or other features that are identified from the insole analysis.

At box 733, the insole personalization application 212 generates the personalized insole data 121 from the modified foot image data 115. In some examples, the personalized insole data 121 represents a negative of the bottom of the 3D foot representation that is modified according to the identified attributes from the 3D insole representation, the user characteristics 136, the shoe properties 139 and/or other data. In some examples, the insole personalization application 212 inputs features associated with the 3D foot representation, the 3D insole representation, the identified attributes, the user characteristics 136, the shoe properties 139, and/or other data into a machine learning model that is trained to output the personalized insole data 121 based at least in in part on the various inputs. In various examples, the personalized insole data 121 comprises an image file format (e.g., computer-aided design (CAD) file) that can be read by a manufacturing system 124 (e.g., a 3D printer) to create a three-dimensional object that corresponds to the personalized insole 103. In other examples, the personalized insole data 121 can be converted into an image file format that is readable by the manufacturing system 124.

At step 736, the insole personalization application 212 transmits the personalized insole data 121 to a manufacturing system 124 configured to manufacture a 3D object corresponding to the personalized insole 103 based at least in part on the features of the personalized insole data 121. For example, the insole personalization application 212 can transmit, over the network 206, the personalized insole data 121 in the appropriate image file format to the manufacturing system 124.

At step 739, the manufacturing system 124 manufactures a 3D object corresponding to the personalized insole 103 or one or more components of the personalized insole 103 based at least in part on the features of the personalized insole data 121. In various examples, the manufacturing system 124 is configured to apply one or more manufacturing techniques such as, for example, 3D printing, injection molding, casting, compression molding, and/or other techniques to manufacture a 3D object based at least in part on the personalized insole data 121. For example, in some embodiments, the manufacturing system 124 comprises a 3D printer configured to print a 3D version of the personalized insole 103 or one or more components of the personalized insole 103 in accordance to the personalized insole data 121.

In various examples, the personalized insole 103 can be manufactured by the manufacturing system 124 as a single component. In other examples, the personalized insole 103 comprises multiple components where one or more components can be manufactured by the manufacturing system 124 using one or more different manufacturing processes. In addition, in some examples, the manufacturing process is fully automated. In other examples, the manufacturing process can include one or more manual steps. In some examples, once the personalized insole 103 is manufactured, a foam layer 127 extending from a heel to the longest toe can be attached to a top portion of the personalized insole 103. Accordingly, the personalized insole 103 can be inserted into the user's shoe. Thereafter, this portion of the process proceeds to completion.

Figure 8:
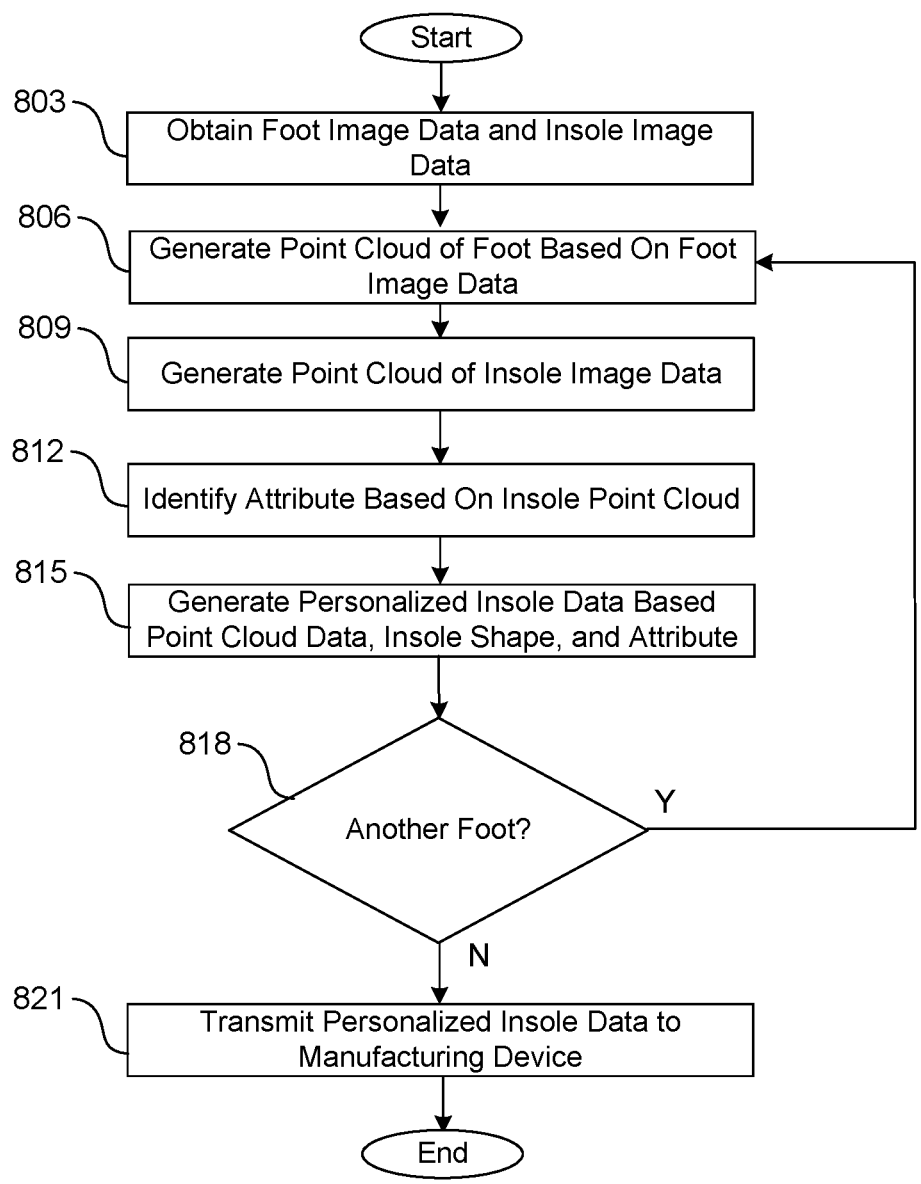
FIG. 8 is a flowchart illustrating one example of functionality implemented as portions of an insole personalization application executed in a computing environment in the networked environment of FIG. 2 according to various embodiments of the present disclosure.

Referring next to FIG. 8, shown is a flowchart that provides one example of the operation of a portion of the insole personalization application 212 according to various embodiments. It is understood that the flowchart of FIG. 8 provides merely an example of the many different types of functional arrangements that may be employed to implement the operation of the portion of the insole personalization application 212 as described herein. As an alternative, the flowchart of FIG. 8 may be viewed as depicting an example of elements of a method implemented in the computing environment 203 (FIG. 2) according to one or more embodiments.

Beginning with box 803, the insole personalization application 212 obtains the foot image data 115 and the insole image data 118 from the scanner system 106. The foot image data 115 includes data corresponding to various images of an individual's foot (e.g., bottom, hindfoot, etc.) that are captured via the optical image sensors 133 placed about a scanner top plate 112 on which the individual has positioned his or her feet during the foot scan. In various examples, the foot image data 115 can be segmented into data for the left foot and/or the right foot of the individual. The insole image data 118 corresponds to images of a top portion of an original insole 109 that is positioned face down on a scanner top plate 112. The images are captured via one or more optical image sensors 133 placed about a scanner top plate 112 and can be used to generate a 3D representation of an insole 109 and/or identify attributes associated with the insole 109 and the individual wearing the shoe containing the insole 109. In various examples, the insole image data 118 can be segmented into data for the left insole and/or the right insole of the individual's shoe.

At box 806, the insole personalization application 212 generates point cloud data corresponding to the 3D representation of a foot based at least in part on the data included in the images obtained from the image sensors positioned at varying angles underneath the scanner top plate 112. In various examples, the insole personalization application 212 can stich or otherwise combine the various data points included in the foot image data 115 for the corresponding foot to form the 3D representation of the foot including the contours and foot geometry specific to the user's foot.

At box 809, the insole personalization application 212 generates point cloud data corresponding 3D representation of an original insole 109 of the corresponding foot based at least in part on the insole image data 118 obtained from the scanner system 106. In particular, the insole personalization application 212 generates point cloud data corresponding to the 3D representation of the insole 109 based at least in part on the data included in the images obtained from the image sensors positioned at varying angles underneath the scanner top plate 112. In various examples, the insole personalization application 212 can stich or otherwise combine the various data points included in the insole image data 118 for the corresponding shoe insole 109 to form the 3D representation of the insole including the insole shape and indications of pressure points or other features identified in the scanned shoe insole 109.

At box 812, the insole personalization application 212 the insole personalization application 212 analyzes the insole image data 118 and/or the 3D representation of the original shoe insole 109 to identify an attribute associated with the original shoe insole 109. The attribute can correspond to an insole shape, a metatarsal head location, one or more wear patterns, one or more walk patterns, one or more pressure areas, and/or other data. For example, if the user has been wearing the particular shoe for a given length of time, the original insole 109 included in the shoe can include various features indicating pressure areas, wear patterns, and/or walk patterns (e.g., toe walker, etc.) of the individual. In addition, the insole image data 118 may indicate a change in thickness, color, and/or texture of the original insole 109 that can indicate wear patterns and pressure points associated with the individual.

At box 815, the insole personalization application 212 generates the personalized insole data 121 based at least in part on the cloud point data corresponding with the foot and the insole, the attribute, and/or other data. In some examples, the personalized insole data 121 represents a negative of the bottom of the 3D foot representation that is modified according to the identified attribute from the 3D insole representation, the user characteristics 136, the shoe properties 139 and/or other data. In some examples, the insole personalization application 212 inputs features associated with the 3D foot representation, the 3D insole representation, the identified attributes, the user characteristics 136, the shoe properties 139, and/or other data into a machine learning model that is trained to output the personalized insole data 121 based at least in in part on the various inputs. In various examples, the personalized insole data 121 comprises an image file format (e.g., computer-aided design (CAD) file) that can be read by a manufacturing system 124 (e.g., a 3D printer) to create a three-dimensional object that corresponds to the personalized insole 103. In other examples, the personalized insole data 121 can be converted into an image file format that is readable by the manufacturing system 124.

At box 818, the insole personalization application 212 determines if there is another foot that requires a personalized insole 103. For example, if the personalized insole data 121 generated at box 815 corresponds to the individual's left foot and personalized insole data 121 still needs to be generated for the individuals' right foot, the insole personalization application 212 will determine that there is another foot and will return to box 806. Otherwise, the insole personalization application 212 will proceed to box 821.

Figure 9:
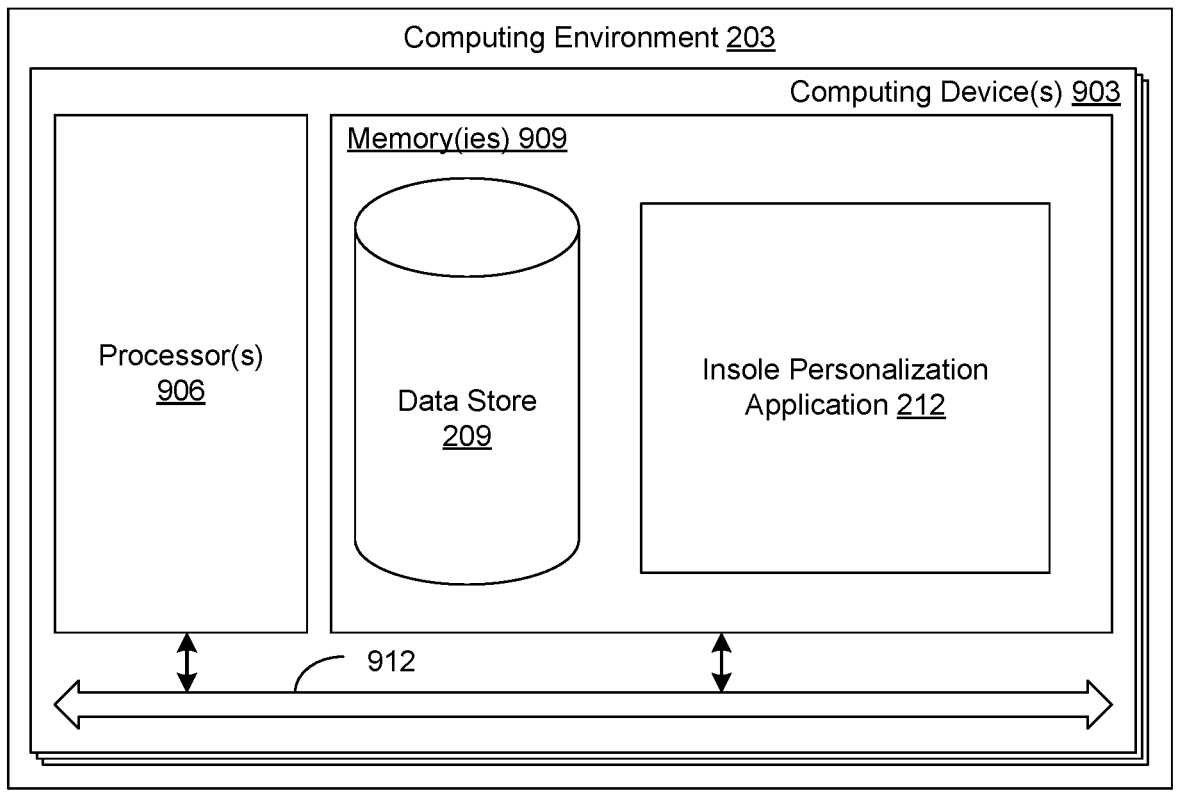
FIG. 9 is a schematic block diagram that provides one example illustration of a computing environment employed in the networked environment of FIG. 2 according to various embodiments of the present disclosure.

At box 821, the insole personalization application transmits the personalized insole data 121 to a manufacturing system 124 configured to manufacture a 3D object corresponding to the personalized insole 103 or one or more components of the personalized insole 103 based at least in part on the features of the personalized insole data 121. For example, the insole personalization application 212 can transmit, over the network 206, the personalized insole data 121 in the appropriate image file format to the manufacturing system 124. The manufacturing system 124 can manufacture a 3D object corresponding to the personalized insole 103 or one or more components of the personalized insole 103 based at least in part on the features of the personalized insole data 121, and the personalized insole 103 can be inserted into the user's shoe. Thereafter, this portion of the process proceeds to completion With reference to FIG. 9, shown is a schematic block diagram of the computing environment 203 according to an embodiment of the present disclosure. The computing environment 203 includes one or more computing devices 903. Each computing device 903 includes at least one processor circuit, for example, having a processor 906 and a memory 909, both of which are coupled to a local interface 912. To this end, each computing device 903 may comprise, for example, at least one server computer or like device. The local interface 912 may comprise, for example, a data bus with an accompanying address/control bus or other bus structure as can be appreciated.

Stored in the memory 909 are both data and several components that are executable by the processor 906. In particular, stored in the memory 909 and executable by the processor 906 are insole personalization application 212, and potentially other applications. Also stored in the memory 909 may be a data store 209 and other data. In addition, an operating system may be stored in the memory 909 and executable by the processor 906.

It is understood that there may be other applications that are stored in the memory 909 and are executable by the processor 906 as can be appreciated. Where any component discussed herein is implemented in the form of software, any one of a number of programming languages may be employed such as, for example, C, C++, C#, Objective C, Java®, JavaScript®, Perl, PHP, Visual Basic® Python®, Ruby, Flash®, or other programming languages.

A number of software components are stored in the memory 909 and are executable by the processor 906. In this respect, the term "executable" means a program file that is in a form that can ultimately be run by the processor 906. Examples of executable programs may be, for example, a compiled program that can be translated into machine code in a format that can be loaded into a random access portion of the memory 909 and run by the processor 906, source code that may be expressed in proper format such as object code that is capable of being loaded into a random access portion of the memory 909 and executed by the processor 906, or source code that may be interpreted by another executable program to generate instructions in a random access portion of the memory 909 to be executed by the processor 906, etc. An executable program may be stored in any portion or component of the memory 909 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 909 is defined herein as including both volatile and nonvolatile memory and data storage components. Volatile components are those that do not retain data values upon loss of power. Nonvolatile components are those that retain data upon a loss of power. Thus, the memory 909 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 906 may represent multiple processors 906 and/or multiple processor cores and the memory 909 may represent multiple memories 909 that operate in parallel processing circuits, respectively. In such a case, the local interface 912 may be an appropriate network that facilitates communication between any two of the multiple processors 906, between any processor 906 and any of the memories 909, or between any two of the memories 909, etc. The local interface 912 may comprise additional systems designed to coordinate this communication, including, for example, performing load balancing. The processor 906 may be of electrical or of some other available construction.

Although the insole personalization application 212, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagram of FIG. 7 and the flowchart of FIG. 8 the functionality and operation of an implementation of portions of components in the networked environment 200. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 906 in a computer system or other system. The machine code may be converted from the source code, etc. If embodied in hardware, each block may represent a circuit or a number of interconnected circuits to implement the specified logical function(s).

Although the sequence diagram of FIG. 7 and the flowchart of FIG. 8 show a specific order of execution, it is understood that the order of execution may differ from that which is depicted. For example, the order of execution of two or more blocks may be scrambled relative to the order shown. Also, two or more blocks shown in succession in FIGS. 7 and 8 may be executed concurrently or with partial concurrence. Further, in some embodiments, one or more of the blocks shown in FIGS. 7 and 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including insole personalization application 212, that comprises software or code can be embodied in any non-transitory computer-readable medium for use by or in connection with an instruction execution system such as, for example, a processor 906 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including insole personalization application 212, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 903, or in multiple computing devices 903 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system comprising:
  a scanning device comprising a plurality of optical sensors positioned about a transparent plate; and
  at least one computing device in communication with the scanning device wherein:
    the at least one computing device includes an application that, when executed, causes the at least one computing device to at least:
      collect foot image data from the scanning device, the foot image data being associated with a foot of a user;
      collect insole image data from the scanning device, the insole image data being associated with a shoe insole of a shoe of the user;
      generate a three-dimensional (3D) foot representation of the foot of the user based at least in part on the foot image data;
      generate a 3D insole representation of the shoe insole based at least in part on the insole image data;
      identify, from the 3D insole representation, at least one attribute of the shoe insole;
      generate a modified version of the 3D foot representation based at least in part on the at least one attribute identified from the 3D insole representation;
      generate personalized insole data based at least in part on the modified version of the 3D foot representation, the personalized insole data representing a negative of a bottom of the modified version of the 3D foot representation; and
      transmit the personalized insole data to a manufacturing system that is to manufacture a personalized insole component for the shoe.

2. The system of claim 1, wherein, when executed, the application further causes the at least one computing device to obtain onboarding data associated with the user and the shoe, and generating the personalized insole data is further based at least in part on the onboarding data.

3. The system of claim 1, wherein detecting the at least one attribute comprises analyzing the insole image data to determine at least one of an insole shape, one or more walk patterns, or one or more pressure areas.

4. A method comprising:
  obtaining, via at least one computing device, foot image data from an optical scanner system, wherein the foot image data is associated with a foot scan of a foot of an individual;
  obtaining, via the at least one computing device, insole image data from the optical scanner system, wherein the insole image data is associated with a shoe insole of a shoe worn by the individual, and wherein the insole image data is obtained from the optical scanner system; and
  generating, via the at least one computing device, personalized insole data based at least in part on a 3D foot representation generated at least in part on the foot image data and at least one attribute of the insole image data, the personalized insole data corresponding to a negative of a bottom of the 3D foot representation.

5. The method of claim 4, wherein the at least one attribute corresponds to at least one of an insole shape, one or more walk patterns of the individual, or one or more pressure areas.

6. The method of claim 5, further comprising modifying the 3D foot representation based at least in part on the at least one attribute.

7. The method of claim 4, further comprising obtaining onboarding data associated with the individual and the shoe, the onboarding data comprising at least one of a role of the individual in an organization, a shoe size, one or more individual defined conditions of the foot, a shoe type, a shoe brand, or an estimated wear time by the individual.

8. The method of claim 7, wherein the personalized insole data is further generated based at least in part on the onboarding data.

9. The method of claim 4, transmitting the personalized insole data to a manufacturing system configured to manufacture a personalized insole component based at least in part on the personalized insole data.

10. The method of claim 9, wherein a shape of the personalized insole component is derived from the insole image data.

11. A computing device comprising:
- at least one processor; and
- at least one memory in communication with the at least one processor, wherein the at least one memory stores an application that, when executed by the at least one processor, causes the computing device to at least:
  - generate a three-dimensional (3D) foot representation of a foot of a user based at least in part on foot image data associated with a foot scan of the foot;
  - detect, from insole image data associated with a scan of an insole of a shoe worn by the user, at least one attribute of the insole;
  - generate a modified version of the 3D foot representation based at least in part on the at least one attribute detected from the insole image data; and
  - generate personalized insole data representing a negative of a bottom of the modified version of the 3D foot representation for the manufacturing of a personalized insole component based at least in part on the modified version of the 3D foot representation.

12. The computing device of claim 11, wherein, when executed, the application further causes the computing device to at least obtain the foot image data and the insole image data from an optical scanning device.

13. The computing device of claim 12, further comprising the optical scanning device, the optical scanning device comprising a plurality of optical sensors positioned in varying angles about a transparent top plate.

14. The computing device of claim 13, wherein the transparent top plate comprises a plurality of sections, a first set of the plurality of sections being for the scan of the insole and a second set of the plurality of sections being for the foot scan.

15. The computing device of claim 11, wherein the at least one attribute corresponds to at least one of an insole shape, one or more walk patterns, or one or more pressure areas.

16. The computing device of claim 11, wherein, when executed, the application further causes the computing device to at least: obtaining onboarding data from a client device, the onboarding data defining one or more properties of at least one of the user or the shoe, and generating the modified version of the 3D foot representation is further based at least in part on the onboarding data.

17. The system-computing device of claim 11, wherein the personalized insole component comprises a three quarter (¾) length insole.

18. The computing device of claim 11, further comprising a manufacturing device and wherein, when executed, the application further causes the computing device to at least manufacture the personalized insole component based at least in part on the personalized insole data.

19. The computing device of claim 11, wherein the foot image data comprises a plurality of images captured from a plurality of optical sensors, and generating the 3D foot representation comprises generating point cloud data based at least in part on the foot image data.

* * * * *

UNITED STATES PATENT AND TRADEMARK OFFICE
CERTIFICATE OF CORRECTION

| | | |
|---|---|---|
| PATENT NO. | : 12,408,730 B1 | Page 1 of 1 |
| APPLICATION NO. | : 17/951363 | |
| DATED | : September 9, 2025 | |
| INVENTOR(S) | : Eric Steven Holan | |

It is certified that error appears in the above-identified patent and that said Letters Patent is hereby corrected as shown below:

In the Claims

In Column 22, Claim 17, Line 20, delete "The system-computing device" and insert --The computing device--.

Signed and Sealed this
Fourth Day of November, 2025

John A. Squires
*Director of the United States Patent and Trademark Office*